United States Patent
Harada et al.

(10) Patent No.: US 6,881,173 B2
(45) Date of Patent: Apr. 19, 2005

(54) VEHICULAR ENGINE STARTING SYSTEM

(75) Inventors: Masahiko Harada, Miyazaki (JP); Jin Yukihara, Miyazaki (JP); Nobuo Watarai, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 45 days.

(21) Appl. No.: 10/370,076

(22) Filed: Feb. 21, 2003

(65) Prior Publication Data

US 2003/0233991 A1 Dec. 25, 2003

(30) Foreign Application Priority Data

Feb. 27, 2002 (JP) .......................... 2002-051443

(51) Int. Cl.[7] .............................................. F16H 59/74
(52) U.S. Cl. ........................................................ 477/99
(58) Field of Search ............................ 477/99; 70/245, 70/251

(56) References Cited

U.S. PATENT DOCUMENTS 4,487,042 A * 12/1984 Mochida et al. .............. 70/186
4,945,740 A * 8/1990 Kawano et al. ............... 70/248

* cited by examiner

Primary Examiner—Dirk Wright
(74) Attorney, Agent, or Firm—Arent Fox PLLC

(57) ABSTRACT

A vehicular engine starting system is provided in which a key cannot be removed from a key hole unless a shift lever is shifted to a parking position, the system including a pivot shaft having a cam surface that abuts against a blocking lever in response to movement of the pivot shaft from a LOCK position to an ACC position. The cam surface is formed into a shape that can move the blocking lever to an engaged position against a spring force of a return spring in response to movement of the pivot shaft from the ACC position toward an ON position. A plunger and the blocking lever are operatively connected so that the plunger is moved toward a retracted position in response to movement of the blocking lever from a disengaged position to the engaged position. Thus, the current consumption and heat generation of the solenoid can be suppressed in engaging the block lever with the pivot shaft in order to prevent the block lever from turning from the ACC position to the LOCK position.

4 Claims, 11 Drawing Sheets

VEHICULAR ENGINE STARTING SYSTEM

BACKGROUND OF THE INVENTION

1. Field of the Invention

The present invention relates to a vehicular engine starting system, and in particular to a vehicular engine starting system in which a key cannot be removed from a keyhole unless a shift lever is shifted to a parking position.

2. Description of the Related Art

In a conventional vehicular engine starting system, a key can be removed from a keyhole only when a shift lever is at a parking position, in order to prevent the vehicle from moving by itself on a slope, etc. while a vehicle user leaves the vehicle. For that purpose, a blocking lever can engage with a pivot shaft pivotable in response to pivoting of the key inserted into the keyhole so as to block the pivot shaft from pivoting from an ACC position to a LOCK position, and is biased by a return spring in a direction in which the blocking lever is disengaged from the pivot shaft. Further, the blocking lever is driven by a solenoid in a direction in which the blocking lever engages with the pivot shaft against the spring force of the return spring, the solenoid being energized when the shift lever is at a position other than the parking position.

However, in the above-mentioned conventional vehicular engine starting system, since the blocking lever in the disengaged position is driven to the engaged position by the solenoid, the solenoid has a comparatively large current consumption, and as a result the amount of heat generated in the solenoid is comparatively large.

SUMMARY OF THE INVENTION

The present invention has been achieved in view of the above-mentioned circumstances, and it is an object of the present invention to provide a vehicular engine starting system that can suppress the current consumption and the amount of heat generated in a solenoid that makes a blocking lever engage with a pivot shaft in order to block the pivot shaft from pivoting from an ACC position to a LOCK position.

In order to accomplish the above-mentioned object, in accordance with a first aspect of the present invention, there is proposed a vehicular engine starting system that includes a pivot shaft that can pivot and sequentially pass a LOCK position, an ACC position, an ON position, and a START position in response to pivoting of a key inserted into a keyhole; a blocking lever that can move between an engaged position and a disengaged position, the blocking lever in the engaged position being engaged with the pivot shaft so as to block the pivot shaft from pivoting from the ACC position to the LOCK position, the blocking lever in the disengaged position being disengaged from the pivot shaft so as to allow the pivot shaft to pivot from the ACC position to the LOCK position; a return spring that biases the blocking lever toward the disengaged position; and a solenoid having a plunger that can move between a projecting position in a non-energized state and a retracted position in an energized state, the plunger in the projecting position being engaged with the blocking lever from the disengaged position side, and the solenoid being energized when a shift lever is in a position other than a parking position; wherein the pivot shaft includes a cam surface that abuts against the blocking lever in response to movement of the pivot shaft from the LOCK position to the ACC position, the cam surface being formed into a shape that can move the blocking lever to the engaged position against a spring force of the return spring in response to movement of the pivot shaft from the ACC position toward the ON position, and wherein the plunger and the blocking lever are operatively connected so that the plunger is moved toward the retracted position in response to movement of the blocking lever from the disengaged position to the engaged position.

In accordance with this arrangement, when the engine is started by pivoting the pivot shaft to the START position by means of the key inserted into the keyhole, the cam surface of the pivot shaft abuts against the blocking lever as the pivot shaft moves from the LOCK position to the ACC position, the cam surface moves the blocking lever to the engaged position against the spring force of the return spring in response to pivoting of the pivot shaft from the ACC position toward the ON position, and the plunger of the solenoid moves to the retracted position in association with the movement of the blocking lever to the engaged position. Consequently, after starting the engine, before the solenoid is energized by shifting the shift lever to a position other than the parking position, for example, the drive position, the plunger is already in the retracted position. That is, the solenoid is required only to exert an electromagnetic force that can maintain the plunger at the retracted position, thus reducing the current consumption of the solenoid and reducing correspondingly the amount of heat generated in the solenoid.

Furthermore, in accordance with a second aspect of the present invention, in addition to the above-mentioned first aspect, there is proposed a vehicular engine starting system that includes a pressure spring disposed between the blocking lever and the plunger, the pressure spring biasing the plunger toward the retracted position, the operating distance of the blocking lever between the engaged position and the disengaged position in a section of the blocking lever with which the plunger is engaged being set to be larger than the operating distance of the plunger between the projecting position and the retracted position. In accordance with this arrangement, when the cam surface moves the blocking lever from the disengaged position to the engaged position, the plunger is pushed without fail to the moving end on the retracted position side due to the spring force of the pressure spring, thereby simply forming an operatively connected structure in which the plunger is moved toward the retracted position in response to the movement of the blocking lever from the disengaged position to the engaged position.

Moreover, in accordance with a third aspect of the present invention, in addition to the above-mentioned second aspect, there is proposed a vehicular engine starting system wherein the pressure spring and the return spring are formed as a unit. In accordance with this arrangement, it is possible to suppress any increase in the number of components, thus suppressing any increase in cost.

The above-mentioned object, other objects, characteristics and advantages of the present invention will become apparent from an explanation of a preferred embodiment that will be described in detail below by reference to the attached drawings.

BRIEF DESCRIPTION OF THE DRAWINGS

FIGS. 1 to 11 show one embodiment of the present invention.

FIG. 1 is a longitudinal sectional side view of a vehicular engine starting system in a state in which it is in an ON position by operation of a key.

FIG. 2 is a view from arrow 2 in FIG. 1.

FIG. 3 is a magnified cross section along line 3—3 in FIG. 1.

FIG. 4 is a magnified cross section along line 4—4 in FIG. 1.

FIG. 5 is an exploded perspective view showing the relative positions of a solenoid, a blocking lever, and a pivot shaft.

FIG. 6 is a perspective view of the blocking lever.

FIG. 11 is a magnified cross section along line 11—11 in FIG. 1.

DESCRIPTION OF PREFERRED EMBODIMENT

Figure 1:
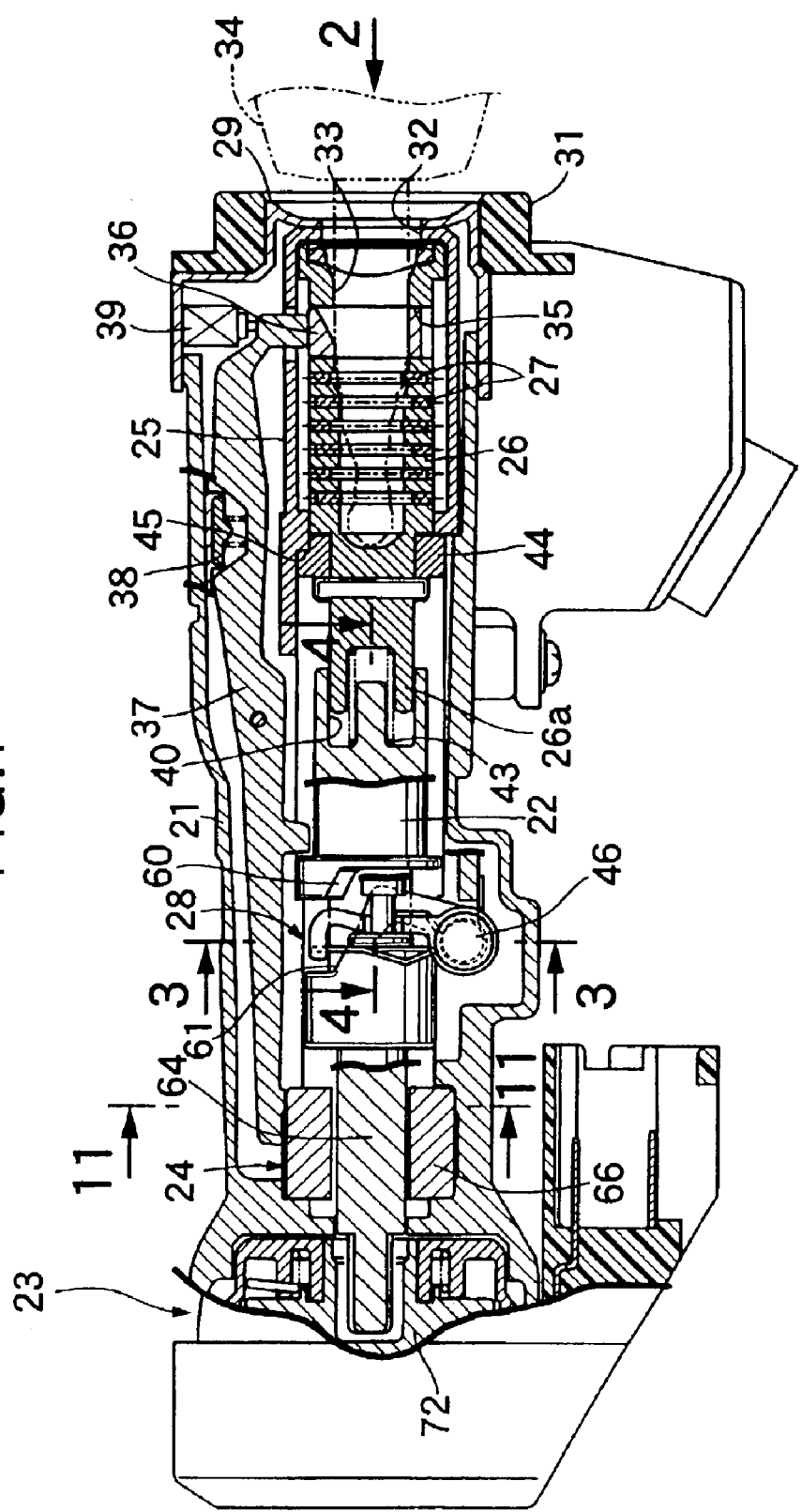

Referring to FIG. 1, a vehicular engine starting system includes a housing 21 mounted on a steering column (not illustrated); a pivot shaft 22 that is supported in the housing 21, the pivot shaft 22 being able to pivot around its axis at a position that is fixed in the axial direction; an ignition switch 23 mounted at a rear end part of the housing 21 so as to be connected to a rear end part of the pivot shaft 22; a locking mechanism 24 that can switch over, in response to pivoting of the pivot shaft 22, between a locked state in which pivoting of a steering shaft 62 (see FIG. 11) is blocked and an unlocked state in which pivoting of the steering shaft 62 is allowed; a cylinder body 25 fixedly disposed within the housing 21 forward of the pivot shaft 22; a rotor 26 that is disposed coaxially with the pivot shaft 22 and is inserted into the cylinder body 25 in a manner such that they can pivot relative to each other, a rear end part of the rotor 26 being fitted into a front end part of the pivot shaft 22 in a manner such that they cannot pivot relative to each other; a plurality of tumblers 27 mounted around the rotor 26 so that they can be switched over between engagement with and disengagement from the cylinder body 25; and a blocking lever 28 that can engage with the pivot shaft 22 so as to block pivoting of the pivot shaft 22.

Provided at a front end part of the housing 21 is a cover 29 covering a front end part of the cylinder body 25. Attached to the cover 29 is a ring member 31 made of a synthetic resin, the ring member 31 covering the cover 29.

Figure 2:
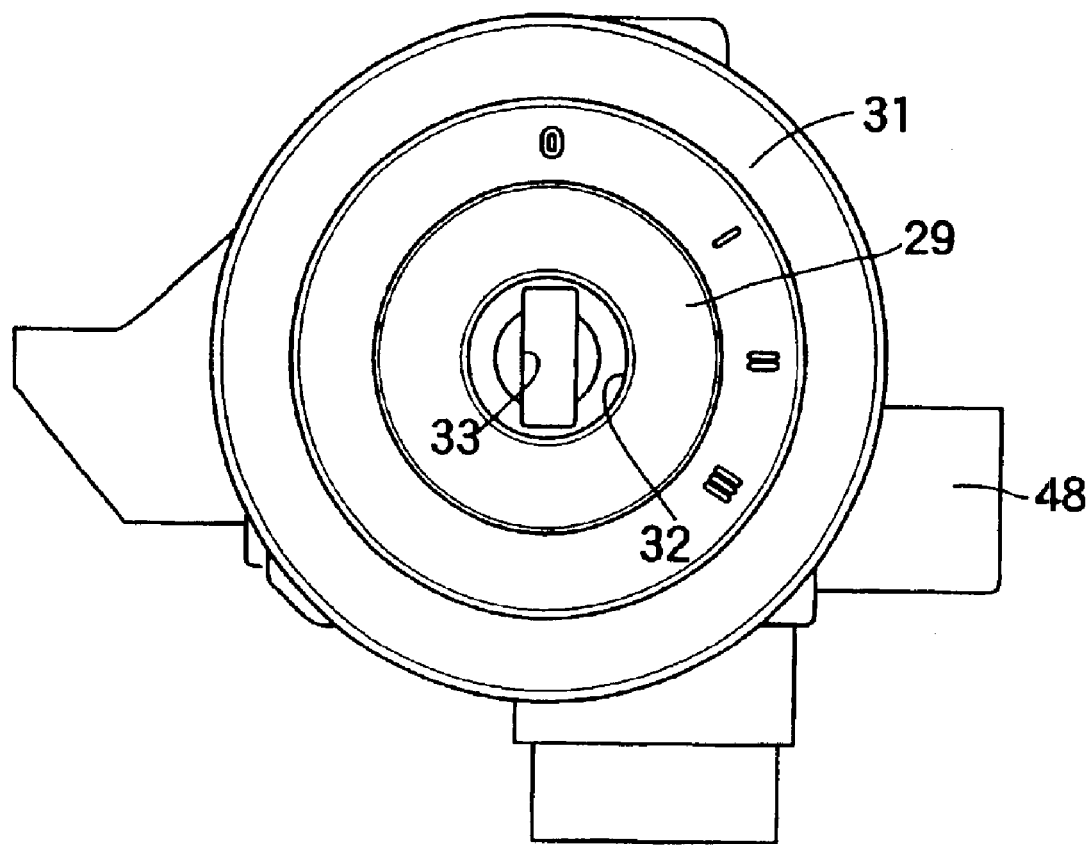

Referring also to FIG. 2, position '0', position 'I', position 'II', and position 'III' are indicated on the front face of the ring member 31 at intervals in the circumferential direction; position '0' is both a key insertion position and a LOCK position at which the locking mechanism 24 is locked, position 'I' is an ACC position at which an electric power can be supplied to accessories other than the engine, position 'II' is an ON position at which the engine is turned on, and position 'III' is a START position for starting the engine.

An opening 32 is provided in front end parts of the cylinder body 25 and the cover 29, the front end of the rotor 26 facing the opening 32. A bottomed keyhole 33 is provided in the rotor 26, a front end opening of the keyhole 33 facing the opening 32. The keyhole 33 is formed into a shape having a rectangular cross section extending along one diameter of the rotor 26 so that a key 34 can be inserted into the keyhole 33.

The tumblers 27 are attached to the rotor 26 at a plurality of positions at intervals in the axial direction. The tumblers 27 are spring-biased in a direction in which the tumblers 27 engage with the inner surface of the cylinder body 25. When the correct key 34 is inserted into the keyhole 33 of the rotor 26, the tumblers 27 move to a position in which they are disengaged from the cylinder body 25, thus allowing the rotor 26 to pivot. In contrast, when the correct key 34 is not in the keyhole 33, the tumblers 27 are engaged with the cylinder body 25, thus blocking the rotor 25 from pivoting relative to the cylinder body 25.

Provided in a front end portion of the rotor 26 is a slide hole 35 that intersects the keyhole 33 along one diameter of the rotor 26. Fitted in the slide hole 35 is a key slider 36 that slides as the correct key 34 is inserted into and removed from the keyhole 33. Disposed outside the key slider 36 is a front end portion of an operating lever 37 that extends in the longitudinal direction within the housing 21 and is pivotably supported in the housing 21. The operating lever 37 is spring-biased by the spring force of a spring 38 in a direction in which the front end portion of the operating lever 37 is made to abut against the key slider 36, the spring 38 being disposed between the operating lever 37 and the housing 21. As the key slider 36 slides radially outward from the rotor 26 by insertion of the key 34 into the key insertion hole 33, the operating lever 37 pivots in a direction opposite to the direction in which it is biased by the spring 38.

A key detection switch 39 is disposed outside the front end portion of the operating lever 37 and is fixedly supported on the housing 21. The switching mode of the key detection switch 39 is changed by pivoting of the operating lever 37 in response to insertion of the key 34 into the keyhole 33.

The rotor 26 has an integral coaxial coupling shaft portion 26a projecting rearward from the rear end of the cylinder body 25. The rear end of the coupling shaft portion 26a is mated with a mating recess 40 provided at the front end of the pivot shaft 22 such that they can slide axially relative to each other but such that they cannot pivot relative to each other around the axis. That is, the pivot shaft 22 pivots in association with pivoting of the rotor 26.

A spring 43 is disposed between the pivot shaft 22 and the coupling shaft portion 26a. The coupling shaft portion 26a, that is, the rotor 26, is spring-biased forward by the spring 43. A ring-shaped collar 44 is fixed to the coupling shaft portion 26a. The collar 44 slides against an engagement surface 45 provided at the rear end of the cylinder body 25, to thereby restrict forward movement of the coupling shaft portion 26a, that is, the rotor 26.

The engagement surface 45 is therefore formed so that, when the rotor 26 is made to pivot from the ACC position to the LOCK position by means of the key 34, it is necessary for the rotor 26 to be pushed rearward against the spring force of the spring 43.

Figure 3:
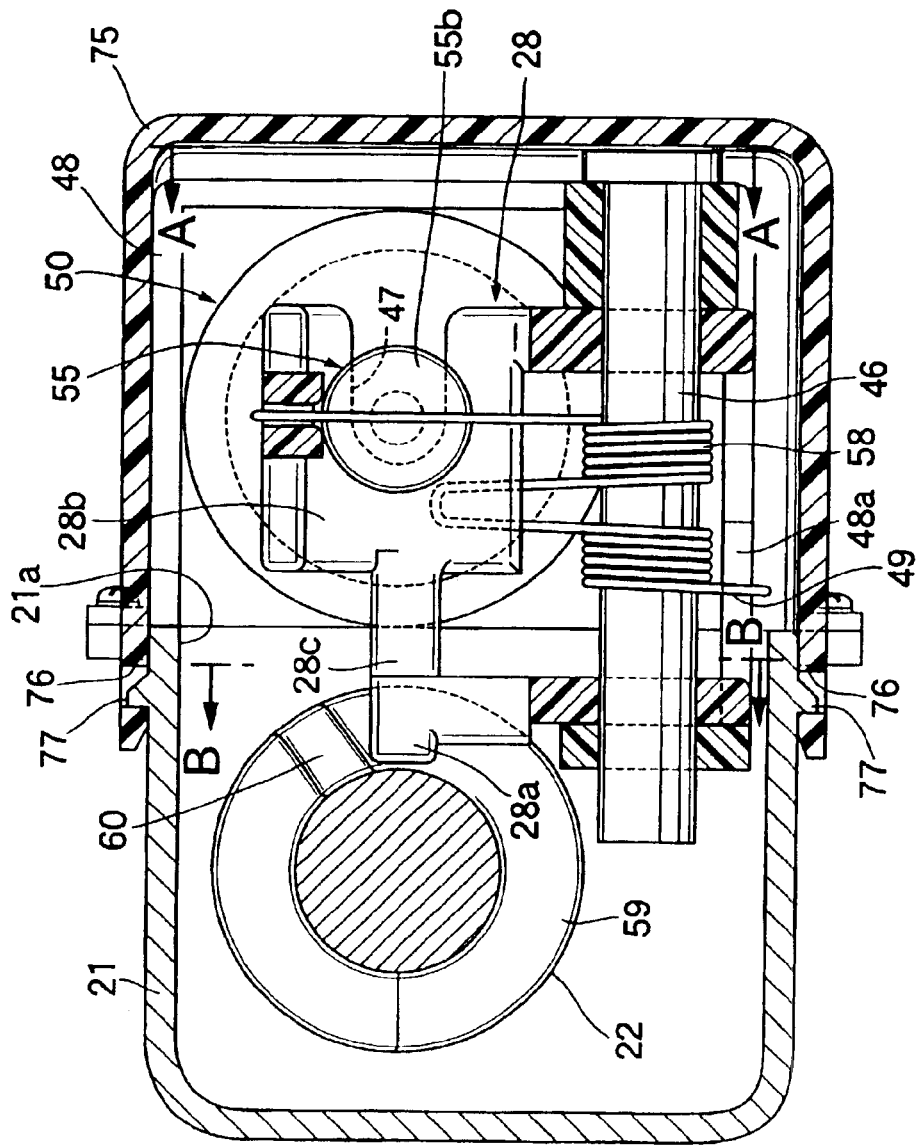
Figure 4:
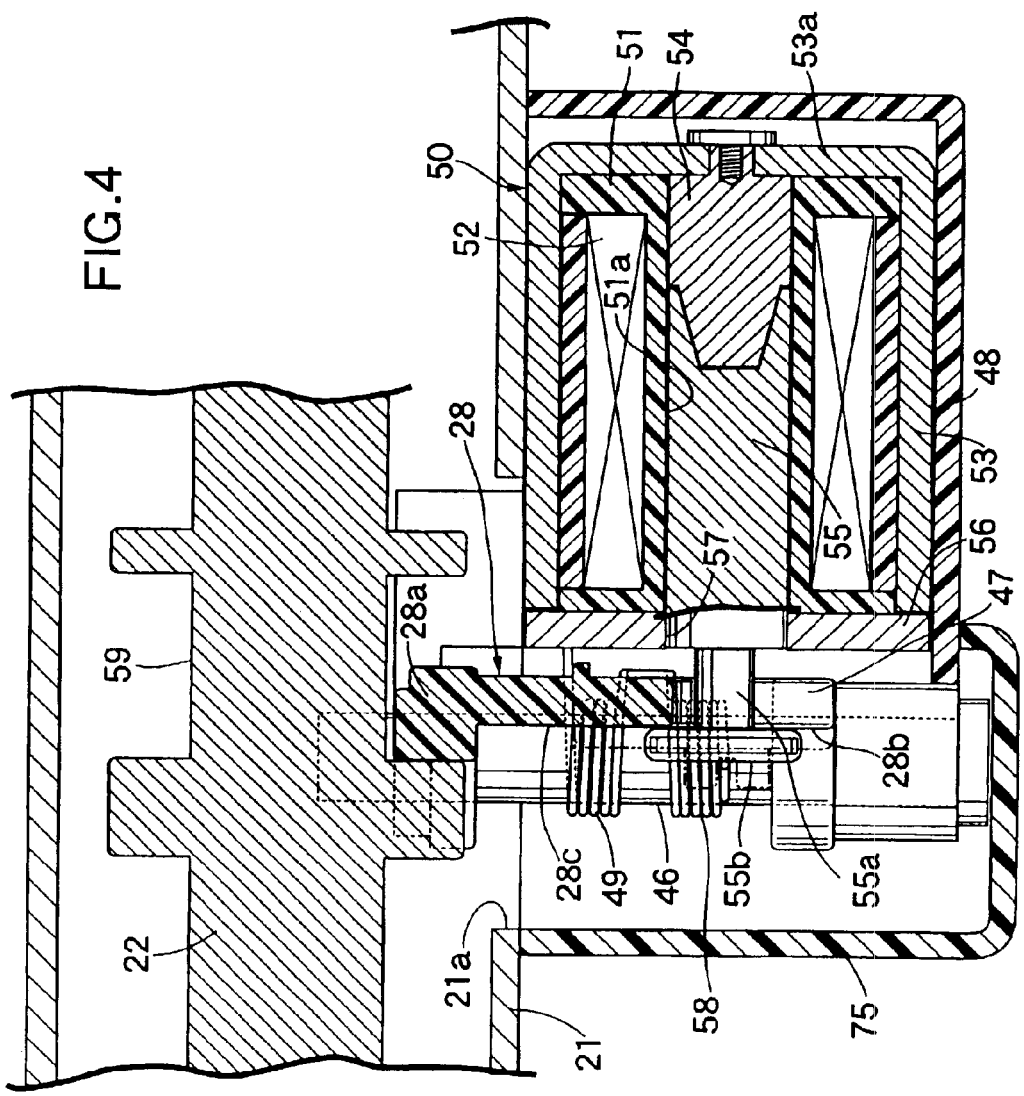
Figure 5:
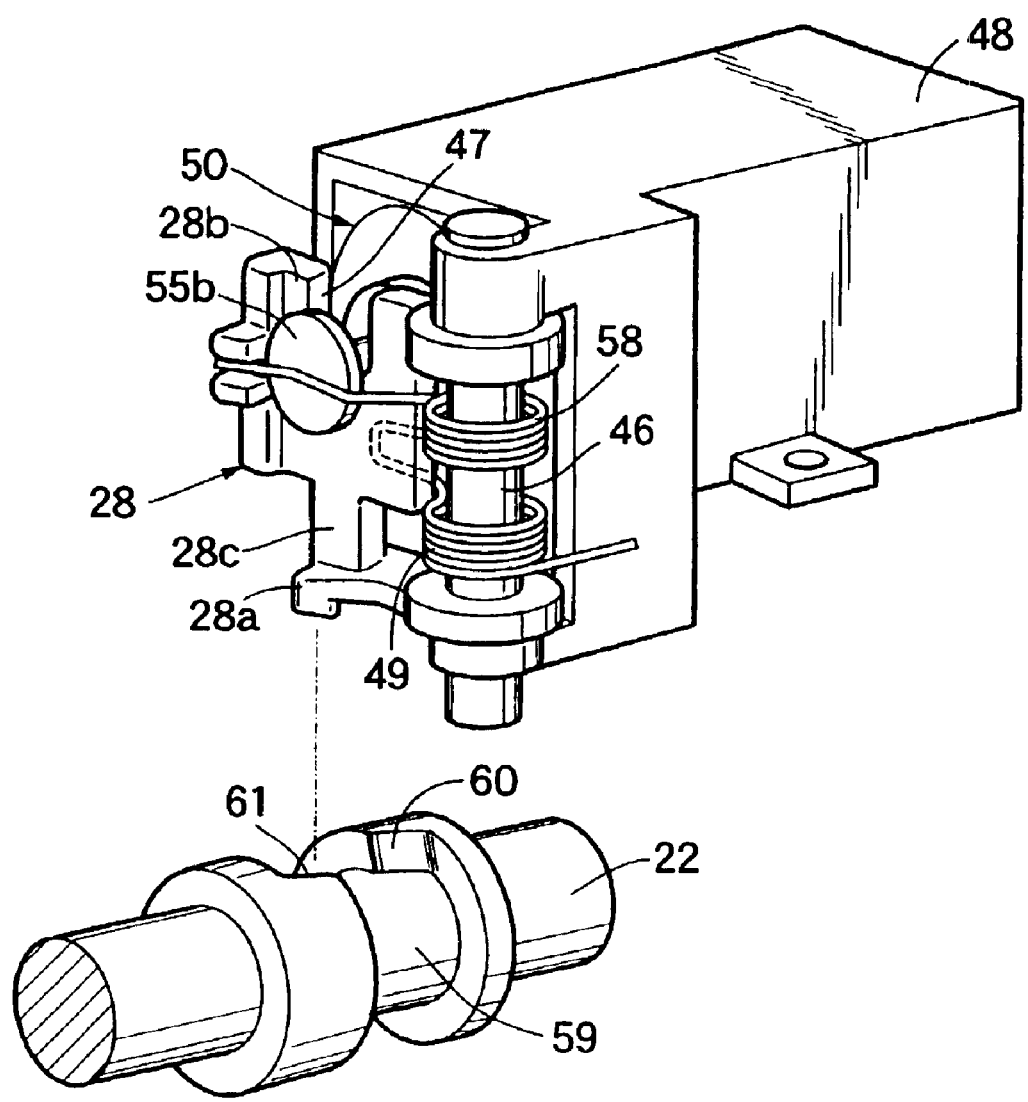

Referring also to FIG. 3 to FIG. 5, the blocking lever 28 can pivot between an engaged position where it is engaged with an axially middle section of the pivot shaft 22 thereby blocking the pivot shaft 22 from pivoting from the ACC position to the LOCK position and a disengaged position where it is disengaged from the pivot shaft 22 thereby allowing the pivot shaft 22 to pivot from the ACC position to the LOCK position. The blocking lever 28 is pivotably supported by a support shaft 46 having its axis perpendicular to a plane containing the axis of the pivot shaft 22.

Figure 6:
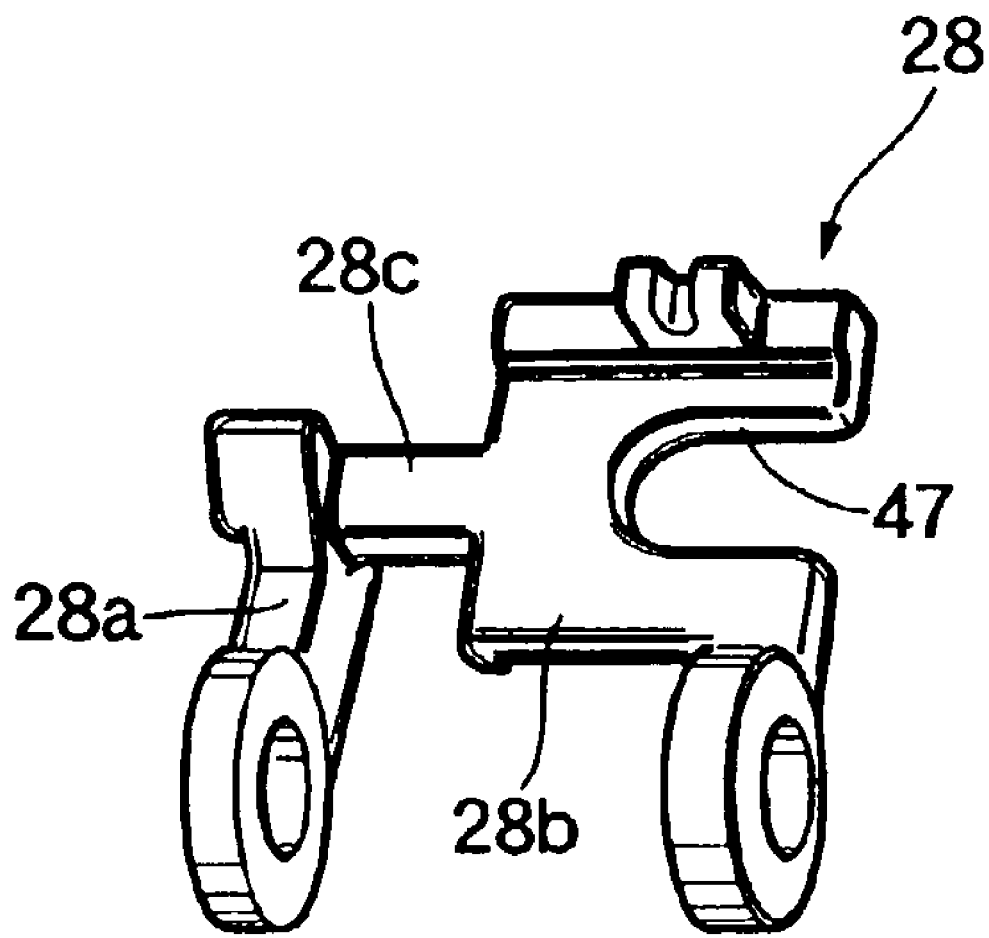

Referring also to FIG. 6, the blocking lever 28 integrally includes a pivot shaft engagement portion 28a, a solenoid engagement portion 28b, and a connecting portion 28c providing a connection between the pivot shaft engagement portion 28a and the solenoid engagement portion 28b. A base part of the pivot shaft engagement portion 28a is pivotably supported by the support shaft 46. A base part of the solenoid engagement portion 28b is pivotably supported by the support shaft 46 at a position away from the pivot shaft engagement portion 28a along the axis of the support shaft 46.

The pivot shaft engagement portion 28a has a substantially L-shaped form in a plane that is perpendicular to the axis of the support shaft 46. The solenoid engagement portion 28b has a substantially flat plate shape in a plane that contains the axis of the support shaft 46. Provided in the solenoid engagement portion 28b is an engagement recess 47 opening on the side opposite to the pivot shaft engagement portion 28a.

The support shaft 46 is supported in a solenoid housing 48 mounted on an outer surface of the housing 21. The blocking lever 28 is supported by the support shaft 46 so that the blocking lever 28 can pivot between the disengaged position shown in FIG. 7 and FIG. 8 and the engaged position shown in FIG. 9 and FIG. 10. Disposed between the solenoid engagement portion 28b of the blocking lever 28 and a spring receiving portion 48a provided on the solenoid housing 48 is a return spring 49 which is a torsion spring surrounding the support shaft 46 so as to bias the blocking lever 28 toward the disengaged position.

Fixedly housed within the solenoid housing 48 is a solenoid 50 having an operating axis parallel to the pivot shaft 22 and being energized when a shift lever (not illustrated) is in a position other than a parking position.

This solenoid 50 includes a bobbin 51 having a central hole 51a; a coil 52 wound around the bobbin 51; a bottomed magnetic cylinder 53 that has a blocking plate 53a abutting against one end of the bobbin 51 and that covers the bobbin 51 and the coil 52; a fixed core 54 magnetically connected to the blocking plate 53a and fixedly inserted into one end of the bobbin 51; a plunger 55 slidably fitted in the central hole 51a of the bobbin 51, one end of the plunger 55 facing the fixed core 54; and a magnetic plate 56 having a through hole 57 in a central part, the magnetic plate 56 abutting against the other end of the bobbin 51 and being joined to an opening of the magnetic cylinder 53, the plunger 55 running movably through the through hole 57.

Provided in the plunger 55 are a small diameter shaft portion 55a and an engagement flange portion 55b, the small diameter shaft portion 55a being inserted through the engagement recess 47 of the solenoid engagement portion 28b of the blocking lever 28, the engagement flange portion 55b being provided integrally at the front end of the shaft portion 55a so that the engagement flange portion 55b can engage with the solenoid engagement portion 28b from the disengaged position side.

Disposed between the engagement flange portion 55b of the plunger 55 and the solenoid engagement portion 28b of the blocking lever 28 is a pressure spring 58 which is a torsion spring surrounding the support shaft 46. The pressure spring 58 applies a spring force to the engagement flange portion 55b to engage it with the solenoid engagement portion 28b. The pressure spring 58 is formed integrally with the return spring 49.

The plunger 55 and the blocking lever 28 are thus operatively connected via the pressure spring 58 so that the plunger 55 is moved toward a retracted position (the position shown in FIG. 10) in which the plunger 55 is closest to the fixed core 54 side, in response to movement of the blocking lever 28 from the disengaged position to the engaged position.

In a state in which the coil 52 is not energized and the plunger 55 is not subject to any attractive force toward the fixed core 54, the plunger 55 moves to a projecting position (the position shown in FIG. 7 and FIG. 8) in which the plunger is farthest from the fixed core 54, in response to pivoting of the blocking lever 28 from the engaged position to the disengaged position due to the spring force of the return spring 49; and in a state in which the coil 52 is energized, the coil 52 exerts an attractive force to maintain the plunger 55 in the retracted position against the spring force of the return spring 49.

Figure 9A:
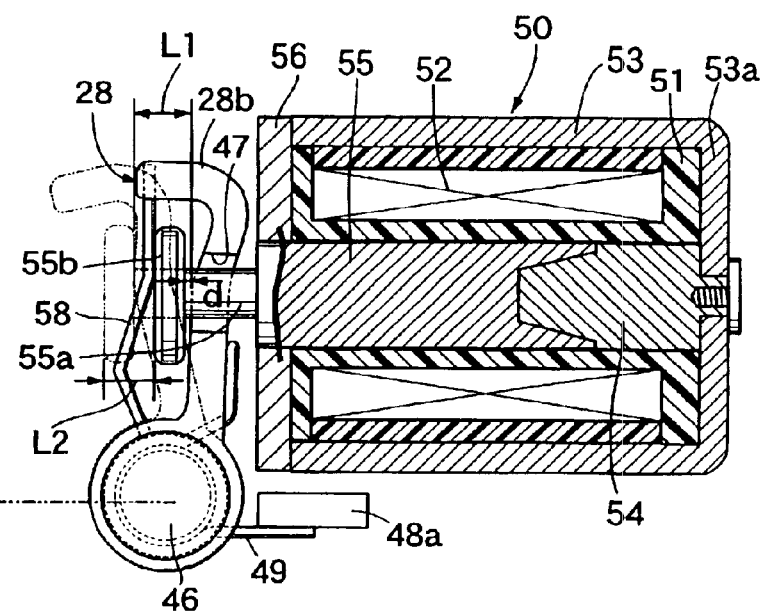
FIGS. 9A and 9B are cross sections along line A—A and line B—B respectively in FIG. 3, showing a state in which the pivot shaft is in the ON position.
Figure 9B:
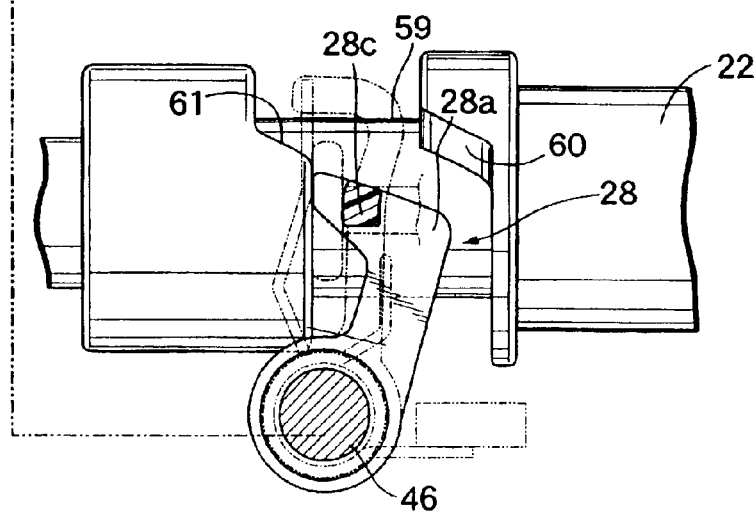
Figure 10A:
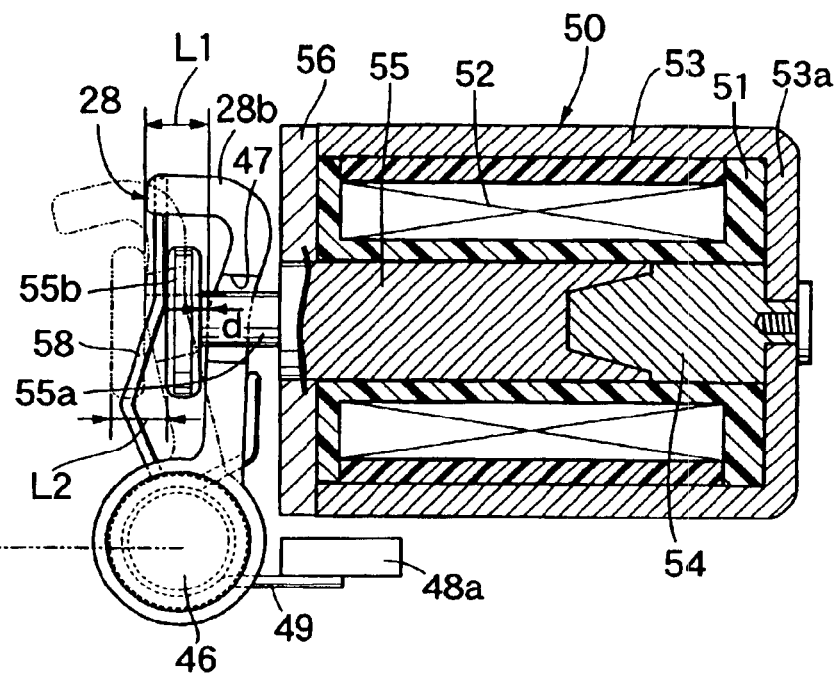
FIGS. 10A and 10B are cross sections along line A—A and line B—B respectively in FIG. 3, showing a state in which the pivot shaft is in the ACC position and the solenoid is energized.
Figure 10B:
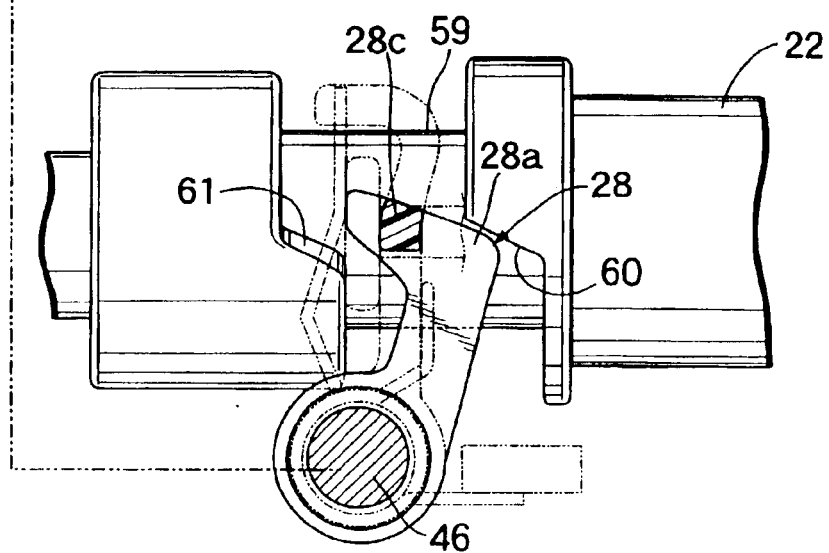

As shown in FIG. 9 and FIG. 10, an operating distance L1 of the blocking lever 28 between the engaged position and the disengaged position in a section where the engagement flange portion 55b of the plunger 55 is engaged, is set to be larger than an operating distance L2 of the plunger 55 between the projecting position and the retracted position. When the blocking lever 28 is in the engaged position and the plunger 55 is in the retracted position, there is a small gap d between the engagement flange portion 55b of the plunger 55 and the solenoid engagement portion 28b of the blocking lever 28, and the pressure spring 58 imposes a spring force on the plunger 55 toward the retracted position.

Formed on the outer periphery of a middle section of the pivot shaft 22 is an annularly extending seating channel 59 for receiving the tip end of the pivot shaft engagement portion 28a of the blocking lever 28. Provided on a section of the side face on the front side of the seating channel 59 is a restricting surface 60 that engages with the pivot shaft engagement portion 28a of the blocking lever 28 when it is in the engaged position so as to block the pivot shaft 22 from pivoting from the ACC position to the LOCK position.

Provided on a section of the side face on the rear side of the seating channel 59 is a cam surface 61 that abuts against the pivot shaft engagement portion 28a of the blocking lever 28 when it is in the disengaged position as the pivot shaft 22 pivots from the LOCK position to the ACC position. The cam surface 61 is formed into a shape that can move the blocking lever 28 to the engaged position against the spring force of the return spring 49 as the pivot shaft 22 pivots from the ACC position to the ON position.

Whereas the solenoid 50 is fixedly housed within the solenoid housing 48 mounted on the outer surface of the housing 21, the pivot shaft 22 is disposed within the housing 21. The housing 21 is provided with an opening 21a through which a section of the pivot shaft 22 corresponding to the seating channel 59 faces outside the housing 21. Furthermore, the support shaft 46, the blocking lever 28 supported by the support shaft 46, the plunger 55 in the solenoid 50, and a part of the solenoid housing 48 are covered with a cover 75 made of a synthetic resin. A plurality of engagement holes 76 are provided in an end part of the cover 75 on the housing 21 side. Resiliently engaging a plurality of engagement lugs 77 projectingly provided on the housing 21 with the respective engagement holes 76 enables the cover 75 to be mounted detachably on the housing 21.

Figure 11:
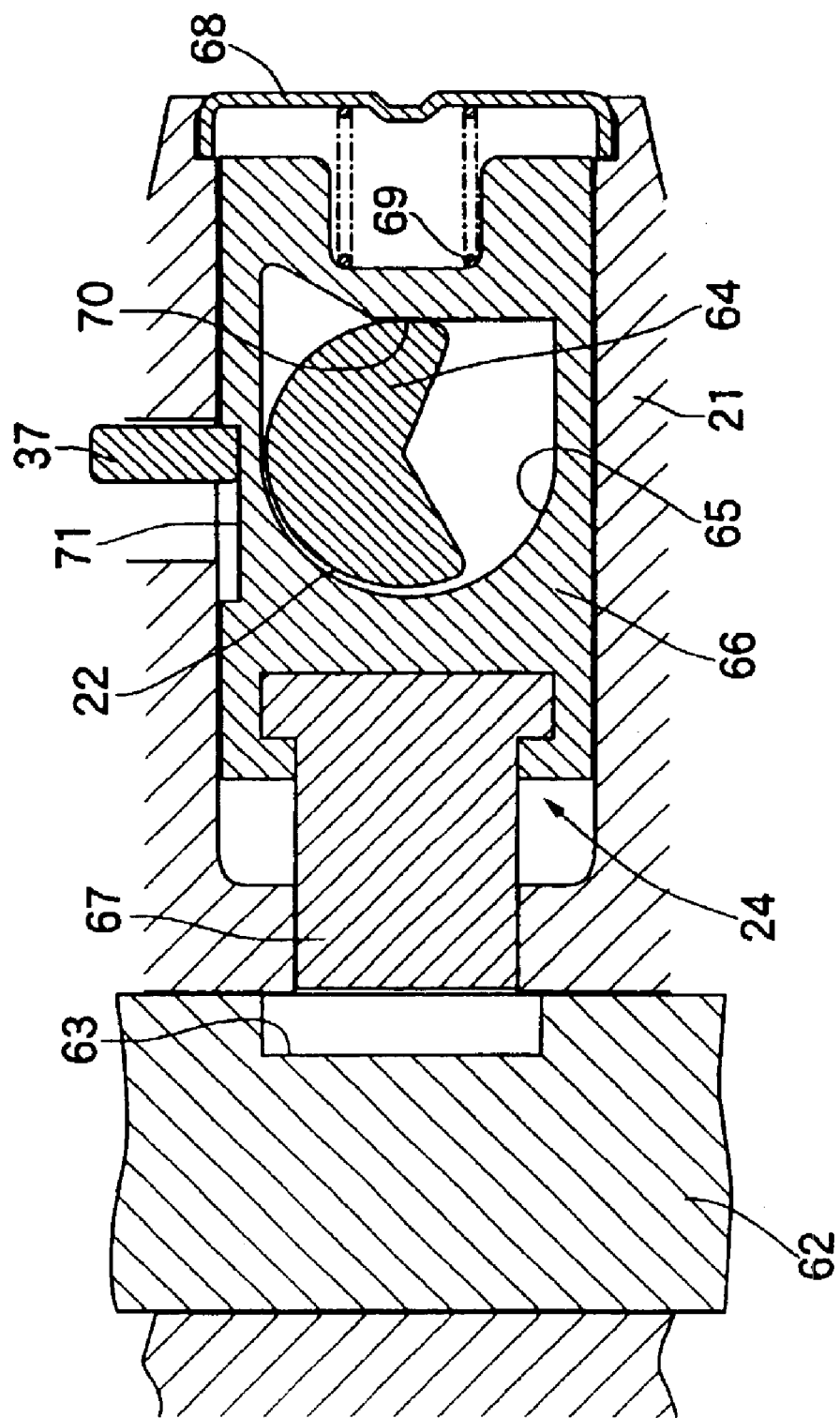

In FIG. 11, the locking mechanism 24 switches over between a locked state in which the engagement recess 63 provided on the outer periphery of the steering shaft 62 is engaged so as to block pivoting of the steering shaft 62 and an unlocked state in which the engagement recess 63 is disengaged so as to allow pivoting of the steering shaft 62. The locking mechanism 24 includes a cam 64, a slider 66, a lock pin 67, and a spring 69. The cam 64 is provided on a middle section of the pivot shaft 22. The slider 66 is an operating member that has a through hole 65 for the cam 64 to run through and is slidably fitted in the housing 21. The lock pin 67 is connected to the slider 66 so that the lock pin 67 can be engaged with the engagement recess 63 of the steering shaft 62. The spring 69 is disposed between the slider 66 and a cap 68 attached to the housing 21, and biases the slider 66 in a direction in which the lock pin 67 is engaged with the engagement recess 63. Formed on the inner surface of the through hole 65 is an abutment surface 70 that abuts against the cam 64 thereby determining the position of the slider 66.

In the locking mechanism 24 having such an arrangement, when the rotor 26 is at a position other than the LOCK position, that is, the ACC position, the ON position, or the START position, the lock pin 67 is detached from the engagement recess 63 thereby allowing pivoting of the steering shaft 62, whereas when the rotor 26 is at the LOCK position, the cam 64 is pivoted to a position such that the spring force of the spring 69 moves the slider 66 thereby making the lock pin 67 engage with the engagement recess 63. The operating lever 37 is made to pivot in a direction in which the rear end thereof approaches the slider 66 as the key slider 36 is made to slide radially outward from the rotor 26 by insertion of the key 34 into the key hole 33. An engagement recess 71 is provided on the outer surface of the slider 66. When the locking mechanism 24 is unlocked as the rotor 26 moves to a position other than the LOCK position, the rear end of the operating lever 37 is engaged with the engagement recess 71 thereby maintaining the locking mechanism 24 in the unlocked state. That is, the locking mechanism 24 can be maintained in the unlocked state even when the rotor 26 is in the LOCK position, unless the key 34 is removed from the key hole 33 and the operating lever 37 pivots in a direction in which the rear end thereof becomes detached from the engagement recess 71.

The rear end of the pivot shaft 22 is connected to an operating member 72 of the ignition switch 23 such that they cannot pivot relative to each other around the axis. The ignition switch 23 carries out switching as the operating member 72 pivots in response to pivoting of the pivot shaft 22.

The operation of this embodiment is now explained. The cam surface 61, which is made to abut against the blocking lever 28 as the pivot shaft 22 pivots from the LOCK position to the ACC position, is formed on the pivot shaft 22. The cam surface 61 is formed into a shape that can move the blocking lever 28 to the engaged position against the spring force of the return spring 49 as the pivot shaft 22 pivots from the ACC position to the ON position.

Figure 7A:
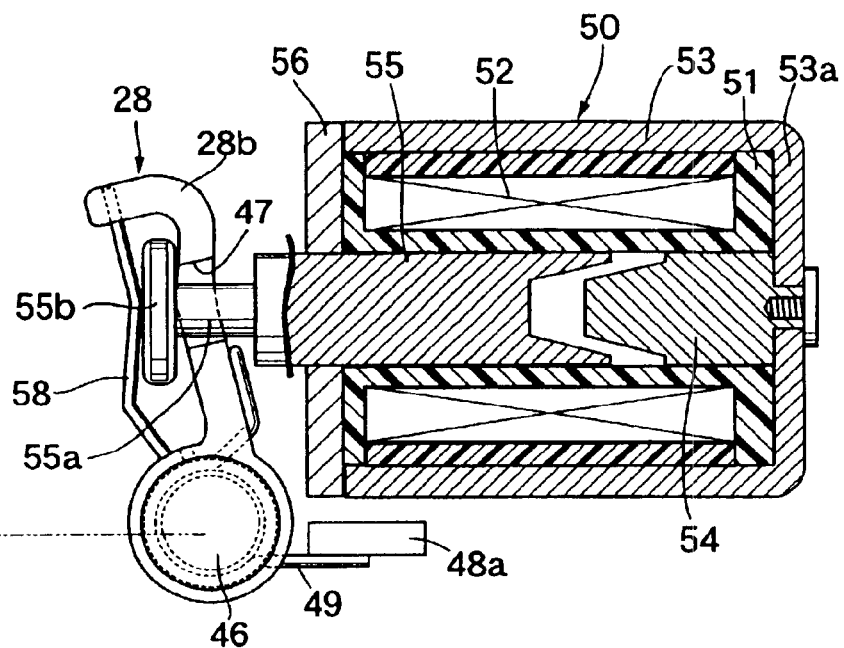
FIGS. 7A and 7B are cross sections along line A—A and line B—B respectively in FIG. 3, showing a state in which the pivot shaft is in a LOCK position.
Figure 7B:
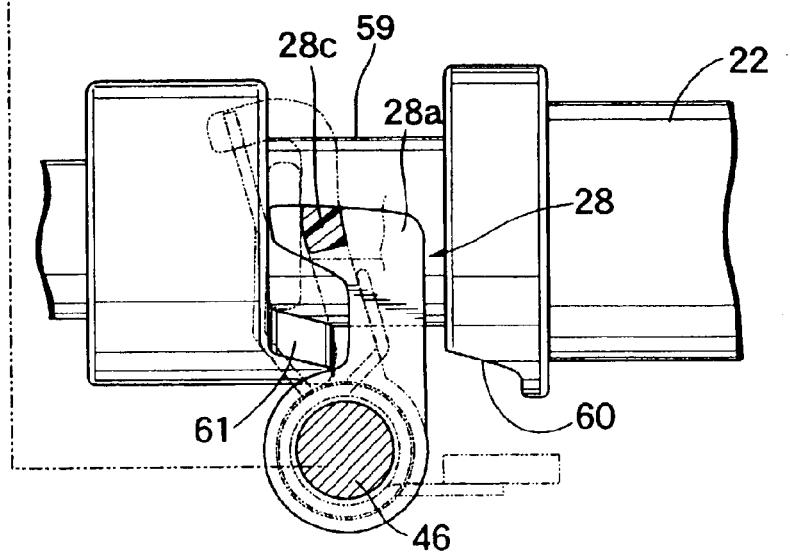
Figure 8A:
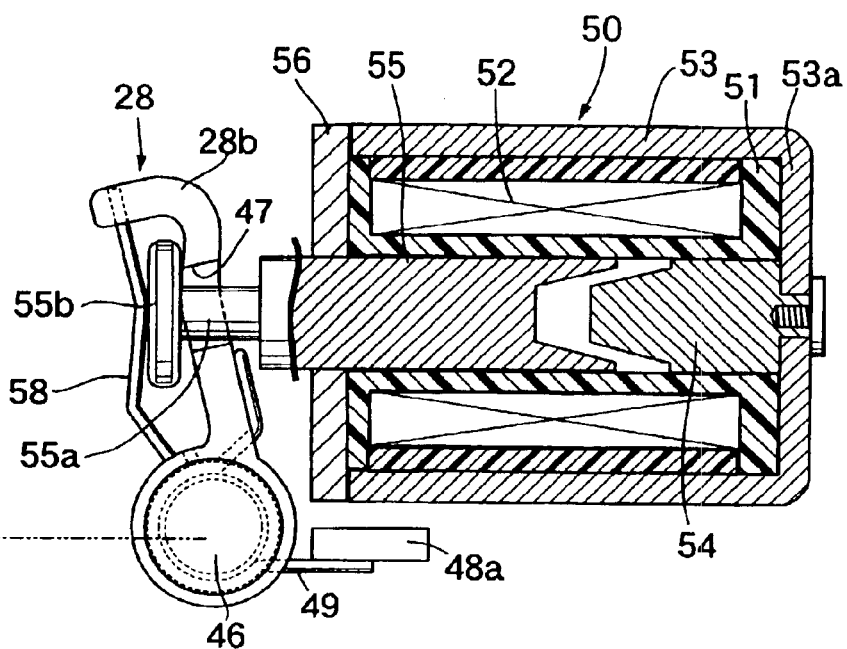
FIGS. 8A and 8B are cross sections along line A—A and line B—B respectively in FIG. 3, showing a state in which the pivot shaft is in an ACC position and the solenoid is not energized.
Figure 8B:
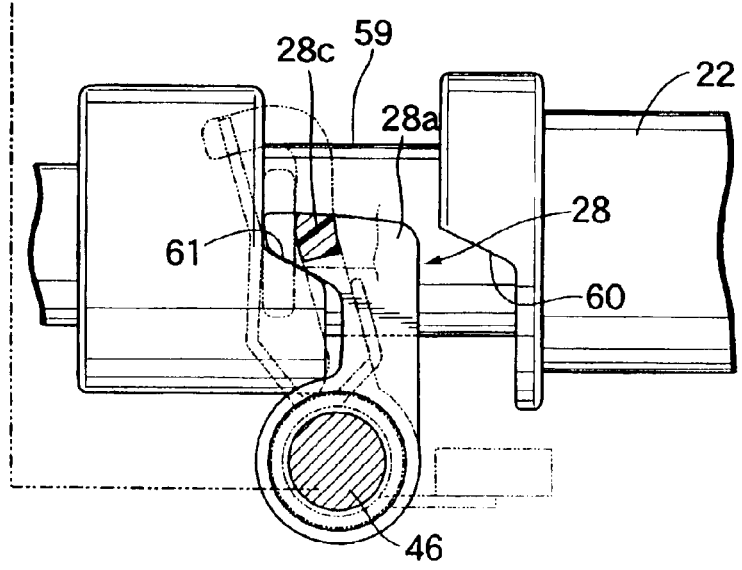

That is, when starting the engine by making the pivot shaft 22 pivot to the START position by means of the key 34 inserted into the key hole 33, in the LOCK position as shown in FIG. 7, the solenoid 50 is not energized and the blocking lever 28 is in the disengaged position. Making the pivot shaft 22 pivot from the LOCK position to the ACC position allows the cam surface 61 to abut against the pivot shaft engagement portion 28a of the blocking lever 28 as shown in FIG. 8, and making the pivot shaft 22 further pivot from the ACC position to the START position allows the cam surface 61 to forcibly make the blocking lever 28 pivot to the engaged position against the spring force of the return spring 49 as shown in FIG. 9.

Since the plunger 55 of the solenoid 50 and the blocking lever 28 are operatively connected so that the plunger 55 is moved to the retracted position in response to pivoting of the blocking lever 28 from the disengaged position to the engaged position, after starting the engine by making the pivot shaft 22 pivot to the START position, the plunger 55 of the solenoid 50 is already in the retracted position before starting to energize the solenoid 50 by shifting the shift lever to a position other than the parking position, for example, the drive position.

As a result, when starting to energize the solenoid 50 by shifting the shift lever to the drive position, etc. after starting the engine, the solenoid 50 is only required to exert an electromagnetic power that maintains the plunger 55 at the retracted position, thus suppressing the current consumption of the solenoid 50 and thereby suppressing the amount of heat generated in the solenoid 50.

When the pivot shaft 22 is made to pivot from the ON position to the ACC position by operation of the key 34, the engine stops, however, if the shift lever is at a position other than the parking position, the solenoid 50 remains energized and the plunger 55 remains at the retracted position. As long as the plunger 55 of the solenoid 50 remains at the retracted position, the blocking lever 28 does not pivot to the disengaged position. Even when an attempt is made to pivot the pivot shaft 22 from the ACC position to the LOCK position, the pivot shaft engagement portion 28a of the blocking lever 28 abuts against the restricting surface 60 as shown in FIG. 10, thus blocking the pivot shaft 22 from pivoting to the LOCK position, and thereby making it impossible to remove the key 34 from the key hole 33.

At this point, shifting the shift lever to the parking position stops energization of the solenoid 50, as a result the blocking lever 28 returns to the disengaged position due to the spring force of the return spring 49, and the pivot shaft 22 is allowed to pivot from the ACC position to the LOCK position, thus enabling the key 34 to be removed from the key hole 33.

Furthermore, the pressure spring 58 is disposed between the blocking lever 28 and the plunger 55, the pressure spring 58 biasing the plunger 55 to the retracted position, and the operating distance L1 of the blocking lever 28 between the engaged position and the disengaged position in the section where the plunger 55 is engaged is set to be larger than the operating distance L2 of the plunger 55 between the projecting position and the retracted position.

As a result, when the cam surface 61 moves the blocking lever 28 from the disengaged position to the engaged position, the spring force of the pressure spring 58 pushes the plunger 55 without fail to the end of movement on the retracted position side as shown in FIG. 9, thus simply forming an operatively connected structure in which the plunger 55 is moved to the retracted position in response to movement of the blocking lever 28 from the disengaged position to the engaged position.

Moreover, since the pressure spring 58 is formed integrally with the return spring 49 which biases the blocking lever 28 to the disengaged position, it is possible to suppress any increase in the number of components, thus suppressing any increase in cost.

Although the present invention is explained in detail above, the present invention is not limited by the above-mentioned embodiment, and the present invention can be modified in a variety of ways without departing from the spirit and scope of the present invention.

What is claimed is:

1. A vehicular engine starting system comprising:

a pivot shaft that can pivot and sequentially pass a LOCK position, an ACC position, an ON position, and a START position in response to pivoting of a key inserted into a keyhole;

a blocking lever that can move between an engaged position and a disengaged position, the blocking lever in the engaged position being engaged with the pivot shaft so as to block the pivot shaft from pivoting from the ACC position to the LOCK position, the blocking lever in the disengaged position being disengaged from the pivot shaft so as to allow the pivot shaft to pivot from the ACC position to the LOCK position;

a return spring that biases the blocking lever toward the disengaged position; and a solenoid having a plunger that can move between a projecting position in a non-energized state and a retracted position in an energized state, the plunger in the projecting position being engaged with the blocking lever from the disengaged position side and the solenoid being energized when a shift lever is in a position other than a parking position;

wherein the pivot shaft includes a cam surface that abuts against the blocking lever in response to movement of the pivot shaft from the LOCK position to the ACC position, the cam surface being formed into a shape that can move the blocking lever to the engaged position against a spring force of the return spring in response to movement of the pivot shaft from the ACC position toward the ON position, and wherein the plunger and the blocking lever are operatively connected so that the plunger is moved toward the retracted position in response to movement of the blocking lever from the disengaged position to the engaged position.

2. The vehicular engine starting system according to claim 1 further comprising a pressure spring disposed between the blocking lever and the plunger, the pressure spring biasing the plunger toward the retracted position, the operating distance of the blocking lever between the engaged position and the disengaged position in a section of the blocking lever with which the plunger is engaged being set to be larger than the operating distance of the plunger between the projecting position and the retracted position.

3. The vehicular engine starting system according to claim 2 wherein the pressure spring and the return spring are formed as a unit.

4. The vehicular engine starting system according to claim 1, wherein the solenoid includes an operating axis parallel to the pivot shaft.

* * * * *